ations the identity of a radar system from the row manifesting
United States Patent Reitboeck et al.

[11] 4,025,920
[45] May 24, 1977

[54] IDENTIFICATION OF RADAR SYSTEMS

[75] Inventors: Heribert J. P. Reitboeck; Thomas P. Brody, both of Pittsburgh, Pa.

[73] Assignee: Westinghouse Electric Corporation, Pittsburgh, Pa.

[22] Filed: Sept. 28, 1972

[21] Appl. No.: 293,241

[52] U.S. Cl. .......................... 343/5 DP; 324/77 G; 324/77 H; 340/146.3 T; 340/146.3 MA; 343/5 SA; 343/18 E

[51] Int. Cl.$^2$ ...................... G01S 1/02; G06K 9/00

[58] Field of Search ............ 343/18 E, 5 DP, 5 SA; 324/77 G, 77 H, 77 R; 340/146.3 T, 146.3 MA, 149 R

[56] References Cited

UNITED STATES PATENTS

| | | | |
|---|---|---|---|
| 3,167,738 | 1/1963 | Westerfield | 324/77 H |
| 3,209,250 | 9/1965 | Burns et al. | 324/77 G |
| 3,290,651 | 12/1966 | Paufve et al. | 340/146.3 MA |
| 3,539,994 | 11/1970 | Clapper | 340/146.3 T |
| 3,564,546 | 2/1971 | Barney et al. | 343/18 E |
| 3,671,964 | 6/1972 | Trochanowski | 343/18 E |
| 3,716,823 | 2/1973 | Thompson et al. | 343/5 SA |
| 3,731,304 | 5/1973 | Caspers | 343/5 DP |

OTHER PUBLICATIONS

Clapper, "Adaptive Assignment of Electronic Templates to Output, IBM Technical Disclosure, v. 12, No. 7, 12-69, pp. 1121-1122.

*Primary Examiner*—Maynard R. Wilbur
*Assistant Examiner*—S. C. Buczinski
*Attorney, Agent, or Firm*—C. F. Renz

[57] ABSTRACT

There is disclosed apparatus for, and a method of identifying radar signals from selected of their parameters, such as azimuth, instantaneous frequency, pulse duration and the like, so that countermeasures may be initiated. Since the signals are sensed from several radars and occur at short intervals of the order of one microsecond or less, and, for effective countermeasures, the radar systems must be identified in a very short time, instantaneous evaluation of the parameters is demanded. The signals are evaluated by a matrix including a pattern of adaptive memory elements, such as magnetic or solid state memory elements (minstors) disposed in columns and rows. A parameter is assigned to the adaptive elements in each column so that each row of adaptive elements corresponds to a set of parameters. The elements in each row are encoded with a different set of adaptations corresponding to the parameters which it is anticipated will match the parameters of the radar systems. Adaptations derived from sensed parameters of a radar system, each corresponding to the parameters assigned to each column, are simultaneously impressed respectively on each column in comparing relationship with the encoded adaptation of the elements. The comparison takes place in real time (instantaneously) for all parameters. A measure of the total deviation of the impressed adaptation from the encoded adaptation for the elements of the row is derived for each row and a determination is made as to the identity of a radar system from the row manifesting the minimum deviation.

11 Claims, 16 Drawing Figures

IDENTIFICATION OF RADAR SYSTEMS

CROSS-REFERENCE TO RELATED DOCUMENTS

U.S. Pat. No. 3,652,324, Chu et al, which discloses a minstor, is incorporated herein by reference.

BACKGROUND OF THE INVENTION

This invention relates to the art of processing communicated intelligence and has particular relationship to the evaluation of such intelligence for the purpose of identifying the characteristics of its source. The processing and evaluation with which this invention concerns itself is of unique interest in the evaluation of intelligence received from hostile radar systems, operating in an area, for the purpose of identifying these systems so that evasive action may be taken or countermeasures initiated.

Typically, it is contemplated that an aircraft carrying identifying apparatus (electronic countermeasure, ECM, devices) is operating in a region under surveillance of hostile radar which may include tracking (fire control) radar and scanning (search) radar. This craft must identify the radar and initiate countermeasures to preclude the location by the radar and destruction of other friendly craft in the area. It is essential that such identifying craft identify the parameters of the radar before the threat of destruction takes effect so that effective counteraction may be taken, both, to frustrate the threat and also to confuse or disrupt the reception of the radar. The identification of the radar and of its purposes must take place in a very short time interval to serve any useful purpose. Of particular importance is the necessity of evaluating the parameters received from the radar to determine if the radar is tracking radar since a craft under the surveillance of tracking radar may anticipate being immediately taken under fire.

Typical of the radar parameters which can serve for evaluation are:
1. Intensity of signal
2. Carrier frequency
3. DOA (direction of arrival)
   a. elevation angle
   b. azimuthal angle
4. PRF (pulse repetition frequency) or PRI (pulse repetition interval)
5. Pulse width
6. Pulse shape
7. Polarization
8. RF phase.

These parameters may inherently change, or may deliberately be changed, rapidly. DOA is inherently variable for an aircraft; carrier frequency is changed to avoid the effects of spot jammers; different pulse widths, pulse repetition frequencies, polarization or pulse shapes might be used against repeater jammers as in electronic counter countermeasure devices (ECCM).

In accordance with the teachings of the prior art, attempts have been made to carry out the identifying process with special purpose high speed computers programmed to give the data on the radars. These attempts have not yielded the high classification or identification rates required in a dense radar environment which is frequently encountered.

It is an object of this invention to overcome the disadvantages and disabilities of the prior art identifying apparatus and to provide radar-identifying apparatus and a method of radar identification which shall yield timely and reliable identification of radar under observation.

SUMMARY OF THE INVENTION

This invention arises from the realization that the prior art special-purpose programmed computers fail to produce satisfactory identification because their computation time is too long to achieve the purpose sought. In a dense radar environment, the transmitted signals or pulses from different radars may arrive at intervals that are only a small fraction of one microsecond in duration and the classification of a pulse and identification of the radar from which it originated must be completed before the next pulse arrives.

In a digital special purpose computer the logic gates have a response time of about 3 to $10 \times 10^{-9}$ seconds. However, the sensed signals corresponding to the different parameters are processed in sequence, and in being processed, each signal must be compared with data in the memory; this comparison consumes about $50 \times 10^{-9}$ seconds per computation. The squaring of the resulting deviations further increases the consumed time so that the total time required per classification is between 1 to $10 \times 10^{-6}$ seconds. Such duration is excessive to serve the purpose of radar identification in a dense radar environment.

It is an object of this invention to provide apparatus for, and a method of, identifying radar in whose use and practice the sensed signals shall be processed simultaneously and where the identification is achieved in real time, i.e., in a time interval comparable to the duration of the pulse; the decision must be reached after the full information on a pulse is completely received but before the succeeding pulse starts to come in.

In accordance with this invention the identification is carried out with a matrix in which is encoded or stored sets of parameters which are compared with the incoming sensed radar parameters. The matrix operates after the principle of a content-addressable associative memory; that is, the entire stored or encoded information in the matrix is addressable through its content by all sensed parameters simultaneously and the classification of the sensed data is carried out in real time (instantaneously).

The matrix consists of a pattern of adaptive elements disposed in what may be described or pictured as n rows and m columns. The adaptive elements are memory devices typically magnetic elements or semiconductor elements, such as minstors which can be encoded and, in dependence on the encoding and external excitation, transmit current, in the case of minstors, or produce other manifestation, for example, outputs of different frequency in the case of magnetic elements. Typically, the adaptive elements of each of the m columns are assigned a different parameter of the radar.

The matrix may be regarded as having a "learning phase"; or an encoding phase and a "knowing phase" or classification phase. During the "learning phase" the adaptive elements of each of the n rows are encoded by adaptations to correspond to parameters of the incoming radar signals; each row being encoded with a different set, $b_1, b_2, b_3, — b_n$, of parameters. During the "knowing phase" the components $c_1, c_2, — c_n$, of the incoming radar signature to be classified, the counterparts of which are typically voltages constituting a measure of the respective sensed parameters, are impressed on, or applied to the adaptive elements in the corresponding columns, in comparing relationship with the encoded adaptations. The total current $I_i$ for the $i$-th row is equal to the sum of the contributions of the adaptive elements in the $i$-th row and may be defined:

$$I_i = \sum_{j=1}^{j=m} G_{ij} e_j$$

where $G_{ij}$ is the conductivity (or adaptation) of the adaptive element in column $j$ and $e_j$ is the voltage impressed.

The currents in the rows $$i \Big|_{i=1}^{m}$$

can be normalized to represent the degree of "similarity" between the pattern originally stored in row $i$ and the pattern (set of object characteristics or parameters) represented by the voltages $$e_j \Big|_{j=1}^{n}$$

in the columns of the matrix. The row manifesting the maximum or minimum current, depending on the criterion selected for evaluation, is singled out by a detector. The detector can be operated with a threshold and a sensed pattern may be identified as "not recognized" if there is a predetermined departure from the threshold.

In the case that the pattern classes consist of one pattern only, the adaptation of the learning matrix can be done in one step. After normalization of the stored pattern vectors, a maximum detector indicates the row with maximum excitation, so that all distorted patterns of a particular class can be recognized.

The maximum detector can be operated with a predetermined threshold (FIG. 2), and a signal $b_s^*$ can be obtained that marks a pattern as "not recognized" if a predetermined amount of distortion is exceeded. If the representative pattern vector of a pattern class is unknown, if several (distorted or undistorted) patterns belong to the same class, or if some of the parameters of a particular radar change with time, the adjustment or encoding of the adaptive elements is carried out in successive steps. In the proposed application, every radar ("pattern class") is represented by a "pattern vector," whose components are derived from the above listed characteristic radar parameters or others. The decision weights of these parameters can be predetermined or they can be evaluated automatically during an adaptation period. Typically, the carrier frequency may be regarded as important and given a high weight; for example, a weighted magnitude of 10 for an input of 1, while for a less important parameter there may be a weighted magnitude of 2 for an input of 1. An INSTANTANEOUS FREQUENCY DISCRIMINATOR (IFD) input of 10 would then produce a magnitude of 100 while for the other parameter an input of 10 would produce a magnitude of 20.

For optimum pattern separation, those parameters that assume only a limited number of discrete values (such as the carrier frequency) are best processed in the "binary" rows of a hybrid learning matrix, or in a learning matrix where in a certain number, $p$, of its m rows the signal is represented in a one-out-of-$p$ code, and where the amplitude of the signal (or the adaptation state of the memory elements at the intersection points of the matrix) is proportional to the decision weight of that radar characteristic or parameter. The binary rows also offer an efficient way to characterize radars that change parameters periodically, such as frequency hoppers. Those radar parameters that change in a continuous way, and where the deviation from the reference signal is a meaningful measure of the dissimilarity between the reference signal and the received signal to be classified (such as intensity and DOA), are processed in the "analog" rows of the matrix.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIGS. 12a, b, c, d are graphs showing the time relationship of the pulses during a classifying operation of the apparatus shown in FIG. 3;

FIGS. 14*a*, *b*, *c*, *d*, *e*, *f*, *g*, *h*, *i*, *j*, *k* are graphs showing the time relationship of the pulses during an encoding or writing operation.

DETAILED DESCRIPTION OF INVENTION

Figure 1:
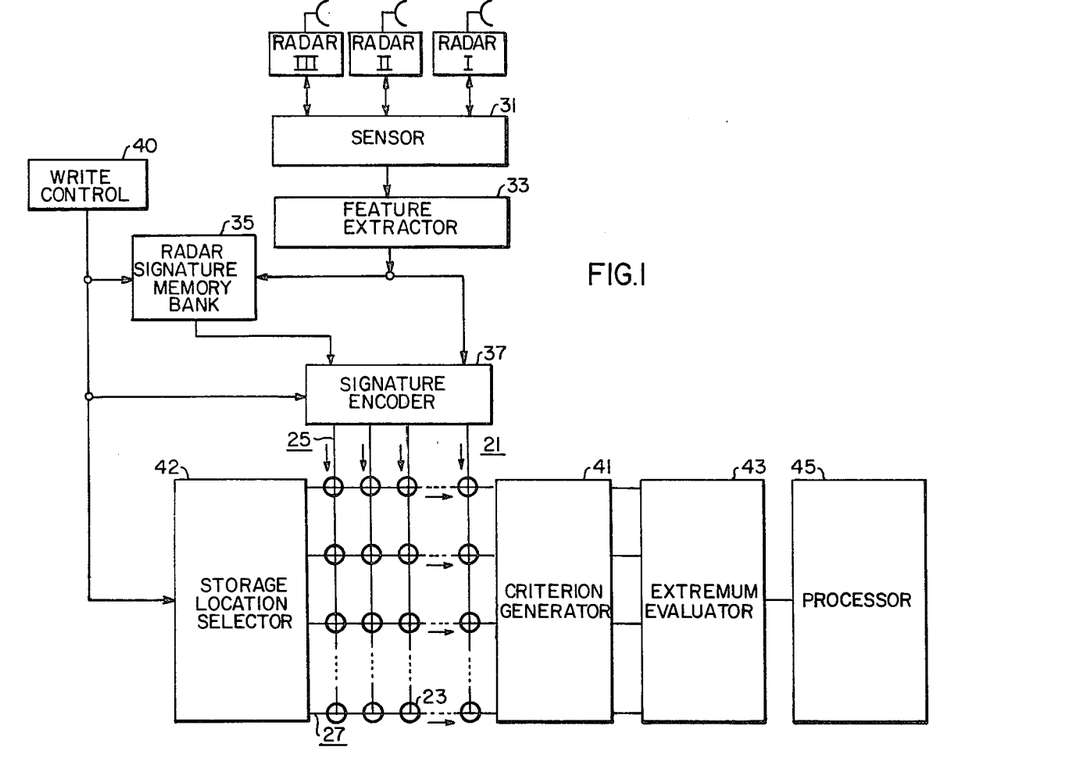
FIG. 1 is a block diagram of an embodiment of this invention and also of apparatus with which the method according to this invention is practiced.

The apparatus shown in FIG. 1 is radar-identifying apparatus which may be airborne and which operates to identify the characteristics of a plurality of radars represented in FIG. 1 as Radar I, Radar II, Radar III. A set of characteristics or parameters of a radar is sometimes referred to in this application as a "signature."

The apparatus shown in FIG. 1 includes a matrix 21 of adaptive devices 23 which may be regarded or pictured as disposed in columns 25 and rows 27. Each adaptive device 23 is a controllable memory element which may be encoded with an adaptation and which, when another adaptation is impressed thereon, compares the impressed and encoded adaptations and produces an output of a magnitude dependent on the result of the comparison.

The apparatus shown in FIG. 1 includes a sensor 31 which picks up or receives the signals from the radars I, II, III. The output of the sensor 31 is supplied to a feature extractor 33 that selects the parameters or characteristics of each radar whose aggregate are to constitute its signature. Each parameter is impressed on the adaptive devices 23 of a column 25 of the matrix 21.

The adaptive devices 23 of each row 27 are encoded with a different set of parameters which are selected to match the impressed parameters. Each device 23 of a row is encoded with a parameter which corresponds to the parameter impressed on the column to which it is connected. The encoding parameters may be derived from a radar signature memory bank 35 which transmits the encoding excitations to the devices 23 through a signature encoder 37. The bank 35 may be a memory which stores data known from previous experiences with radars I, II, III or it may store current data received from radars I, II, III or it may be stored by feedback based on the results of the comparisons carried out in the matrix 21.

The encoding is controlled by a write (or encode) control 40 which enables the radar signature memory bank 35 and the signture encoder during the encoding. The write control 40 also enables a storage location selector 42 which selects the row of the matrix 21 in which the encoding is to take place.

The results produced by the comparison in each device 23 is manifested as a current, voltage or frequency or other manifestations. The results of the devices 23 of each row 27 are summed in a criterion generator 41 and compared in an extremum evaluator 43 to determine an extremum, a minimum or maximum, depending on the basis of evaluation. The response of the extremum evaluation is further processed in a processor 45. Depending on the intelligence which it receives, the processor 45 indicates what action is to be taken by way of countermeasures and in some cases, where the identification is significant but where the water with the stored radar signture is not perfect, sends a feedback to the signature memory bank 35 that initiates readaptation of the stored data.

Figure 2:
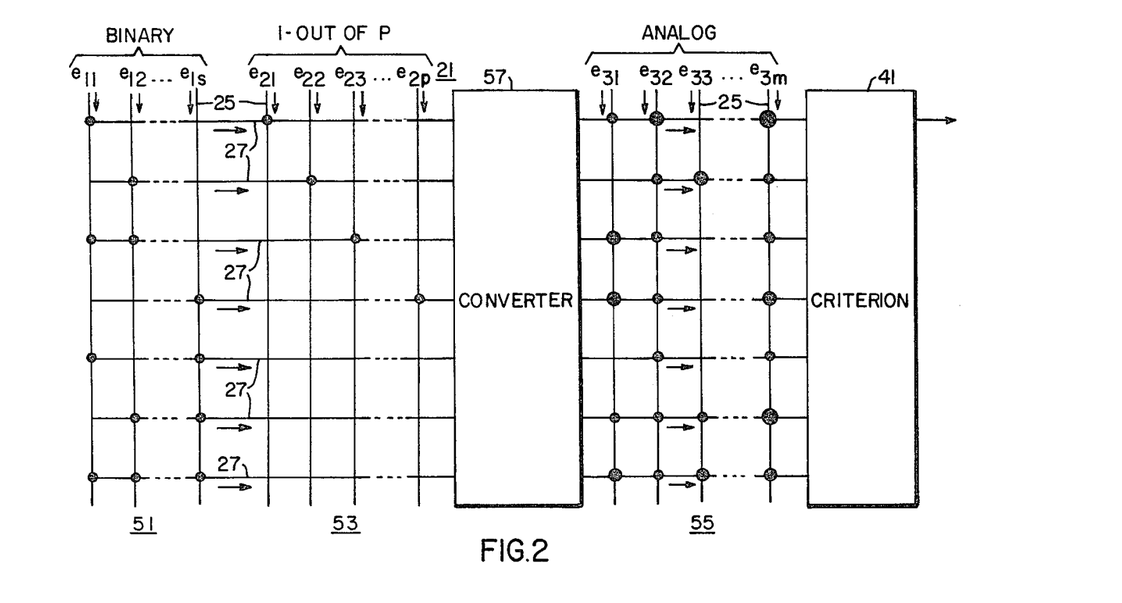
FIG. 2 is a diagram illustrating the different ways of entering parameters for evaluation in the practice of this invention in a hybrid matrix.

As shown in FIG. 2, the different parameters may be handled differently in the matrix 21 in dependence upon their properties. Certain parameters, $e_{11}$ and $e_{21}$, may be encoded by digital comonents either in a binary system, $e_{11}$ to $e_{15}$, represented by lines 51, or by the selection of one out of a set of components $e_{21}$ to $e_{2p}$, represented by lines 53. Others, $e_{31}$, $e_{32}$ —$e_{3m}$, may be encoded by analog components, represented by lines 55. Typically, such information about a radar, whether it is a frequency hopper or a constant frequency radar, or as either a scanning radar or a tracking radar, and classification of the signal as horizontally or vertically polarized, can be effectively encoded in a one-out-of-2-code. Where several properties of a radar, which lend themselves to category classification, are to be determined, the digital selection may be one out of a number p. The carrier frequency could be handled digitally by binary representation. Azimuth elevation and parameters describing the pulse envelope are most efficiently handled by analog representation. For evaluation the results derived from the comparison of the encoded and impressed digital magnitudes are converted into analog mangitudes by a converter 57 and handled with the analog manitudes in lines 55.

Typical of the devices 23 which can be used for analog handling are sets of complementary minstors. Such a set computes a square of the deviation of the impressed parameter from the encoded parameter. For digital encoding single minstors can be used.

The apparatus shown in FIGS. 1 and 2 must operate at a very high speed. Classification of a signal sensed from one of the radars, radar I for example, must be completed before a second pulse from radar II or III arrives. The required classification time is 10 - 100 × $10^{-9}$ seconds, and this time cannot be accommodated by the prior art identification apparatus with special purpose computers.

Figure 3:
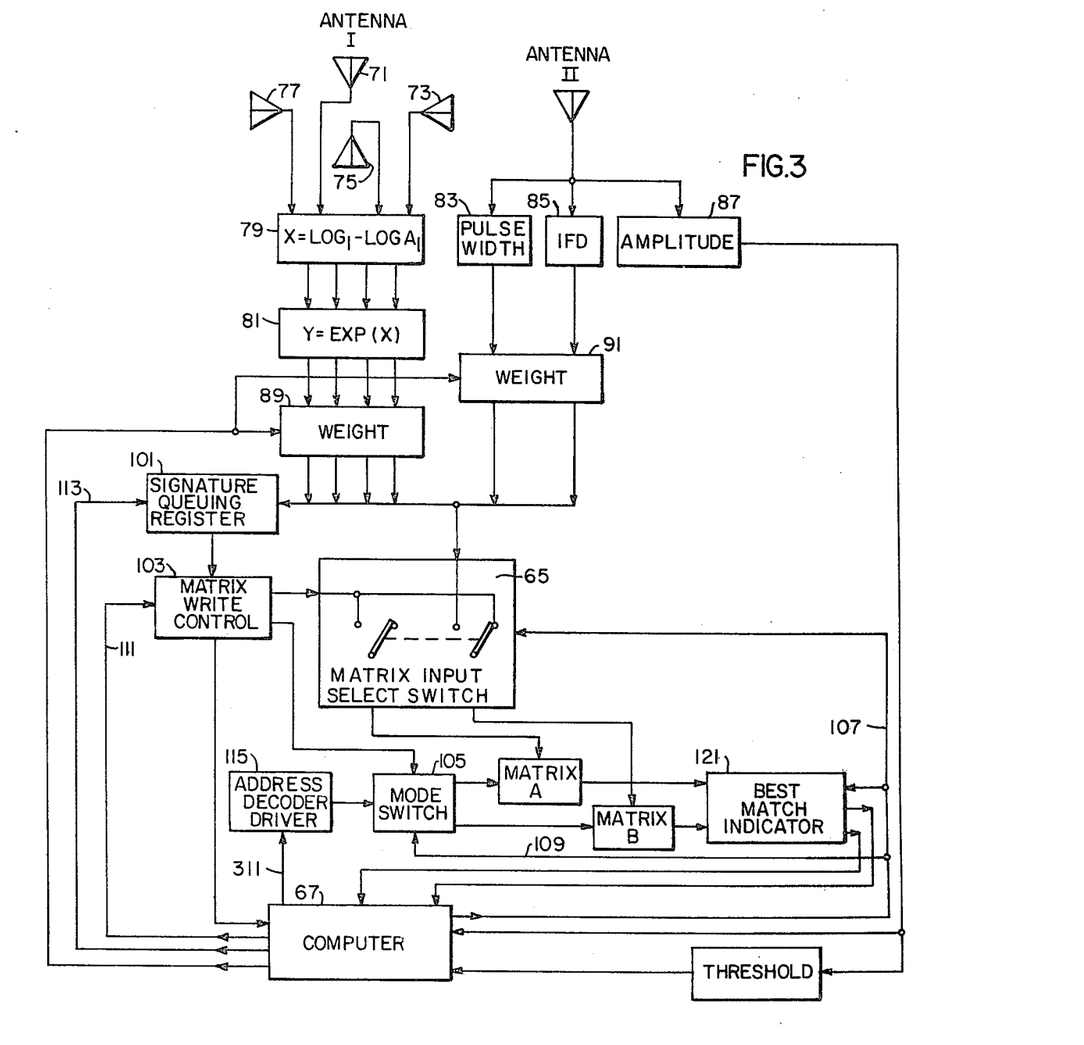
FIG. 3 is a block diagram showing the various components of apparatus according to, and for practicing, this invention and the interrelationship between these components.

FIG. 3 shows identification apparatus for classifying radar in real time by processing the parameters, direction, azimuth typically, pulse width (duration, carrier frequency, pulse amplitude, and pulse repetition frequency (PRF). This apparatus includes Matrix A and Matrix B which are connected by matrix-input select switch 65 to operate in tandem to assure uninterrupted classification while the encoded data may be updated. This apparatus also includes a computer 67. Only the direction, pulse width and carrier frequency are processed by the Matrices A and B. The PRF is derived from the data processed by the matrices and the pulse amplitude is processed directly by the computer 67. The pulse amplitude is impressed on the computer directly and also through a threshold detector 69 which is set for a certain amplitude. On receipt of a pulse through the threshold-detector 69, the computer signals that there is an immediate threat.

Figure 3A:
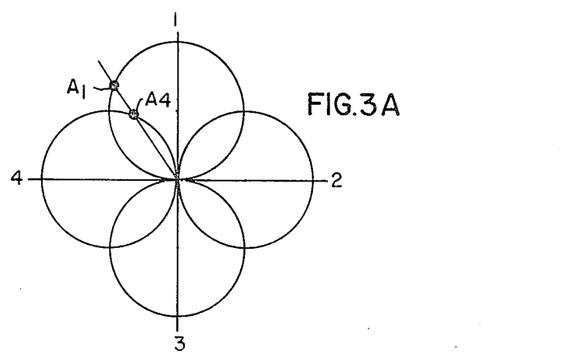
FIGS. 3A and 3B are graphs illustrating the respective operations of the sensing antennas used in the practice of this invention.
Figure 3B:
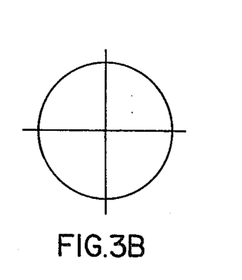

The signals from the radar are picked up by directional atenna I having the pattern shown in FIG. 3A, and unidirectional antenna II, having the omnidirectional pattern shown in FIG. 3B. Antenna I includes four coplanar beams 71, 73, 75, 77. The patterns of the beams 71–77 may be regarded as having axes 1–3 and 2–4 between which directional quadrants are defined. A signal received within any quadrant, for example quadrant 1–4 (FIG. 3A) may be regarded as having a component A1 along axis 1 and a component A4 along axis 4. The ratio A1/A4 is the tangent of the angle which the beam forms with axis 4; the tangent is a measure of the direction of the beam. To avoid loss of time the received signal is passed through a component 79 which computes the difference between the logarithm of A1 and A4. Solid-state components which arry out this operation are widely available. The difference in the logs is converted into the quotient A1/A4 by another component 81. The pulse width, PD, and amplitude are derived by extractors 83, 85, 87 rom the signal received by Antenna II.

The direction and the pulse width and IFD are weighted in accordance with their importance by weight components 89 and 91 respectively. The weight is controlled, in accordance with tactical demands, by the computer 67.

The weighted magnitudes of the parameters are impressed on, or applied to Matrix A or Matrix B, depending on the setting of matrix-input select switch 65, and are stored in a signature queuing register 101. In the setting of switch 65 shown in FIG. 3, the weighted-parameter magnitudes are impressed for classification in Matrix A. Typically, the queuing register 101 is a short-term memory having bout four locations (FIG. 1).

The apparatus includes a matrix write control 103 and a mode switch 105. This control 103 and switch 105 cooperates with the queuing register 101 to transmit the data in the queuing register 101 to the Matrix A or B set for writing or encoding. Data stored in the queuing register 101 is transmitted through the write control 103 and the select switch 65 to the Matrix A or B set for encoding. In FIG. 3 Matrix B is so set. The matrix-input select switch 65 and the mode switch 105 are controlled from the computer 56 over channels 107 and 109 to operate together. The matrix write control 103 and the queuing register 101 are likewise controlled by commands from the computer through channels 111 and 113. Each, Matrix A and Matrix B, is switched in its turn alternately to be encoded or to classify. The address in a matrix, that is, the line or row of the matrix, which is to be encoded, is set by an address decoder driver 115 controlled by the computer 67. Typically, the computer transmits a binary code 00, 01, 11, or the like to the driver 115 and the driver sets the mode switch to encode a corresponding line, for example, no line, line 1, line 2, or the like, in Matrix A or Matrix B.

In classifying a measure of the total effective deviations for the adaptive devices in the rows of Matrix A or B, whichever is in the classifying mode, is compared in a best match indicator 121 and the row with the best match is identified, and the extent of the match is determined.

In the practice of this invention, it may be assumed that the apparatus is set as shown in FIG. 3 with the adaptive devices of Matrices A and B encoded to correspond to anticipated sets of radar parameters. A received or sensed set of parameters is stored in the queuing register 101 and also is simultaneously impressed and instantly processed by the adaptive devices of Matrix A. The rows of Matrix A instantaneously impress their respective measures on the best match indicator 121 which identifies the minimum deviation.

The measure of the encoded data in each row may be treated as an n-dimensional vector $E_R$ and the impressed data as an n-dimensional vector $E_i$. The Euclidean distance between the vectors $E_i$ and $E_R$ is a measure of the total deviation, in the row, of the impressed parameter adaptations from the encoded parameter adaptations. This distance is equal to the square root of the sum of the squares of the differences between the components of the vectors; that is, the sum of the squares of the differences between the impressed adaptation and the encoded adaptation for each adaptive element in the row. The best match indicator 121 selects and processes the data from the row whose Euclidean distance is the minimum. The minimum distance, that is, the minimum magnitude of $E_i - E_R$ is compared to a smaller magnitude $Z_1$ and a larger magnitude $Z_2$, and is categorized in one of three categories:
 1. distance less than $Z_1$,
 2. distance greater than $Z_1$, but less than $Z_2$,
 3. distance greater than $Z_2$.

The address of the row $i$ and the category are transmitted to the computer for further processing.

If the minimum distance for any row is smaller than $Z_1$, the radar which produced the impressed data is treated as classified or recognized, and its parameters are assumed to be the encoded parameters in the row. If the minimum distance is in category 2, the radar which produced the impressed data is treated as classified. However, the matrix write control 103 is enabled to update the data in Matrix B and the data in the queuing register 101, is transferred to Matrix B. Select switch 65 is then actuated and Matrix B is used for further classification and Matrix A is updated. If the distance between the data vectors is larger than $Z_2$, the impressed signal is considered as originating from an unknown radar and can be stored in a free row of each of the matrices A and B. The information in any row of a matrix that has not responded for a specific time interval can be quenched by executing an erase half-cycle in that row.

The intervals between the responses of a particular row processed in the computer 67 give the pulse repetition rate or frequency, which is used, together with information on the pulse amplitude, and its variation, for the final classification (immediate threat, tracking radar, scanning radar) and the initiation of countermeasures. For any radar which is identified or classified, the signature stored in the queuing register 101 is erased and the location made available for new data.

Figures 4, 5:
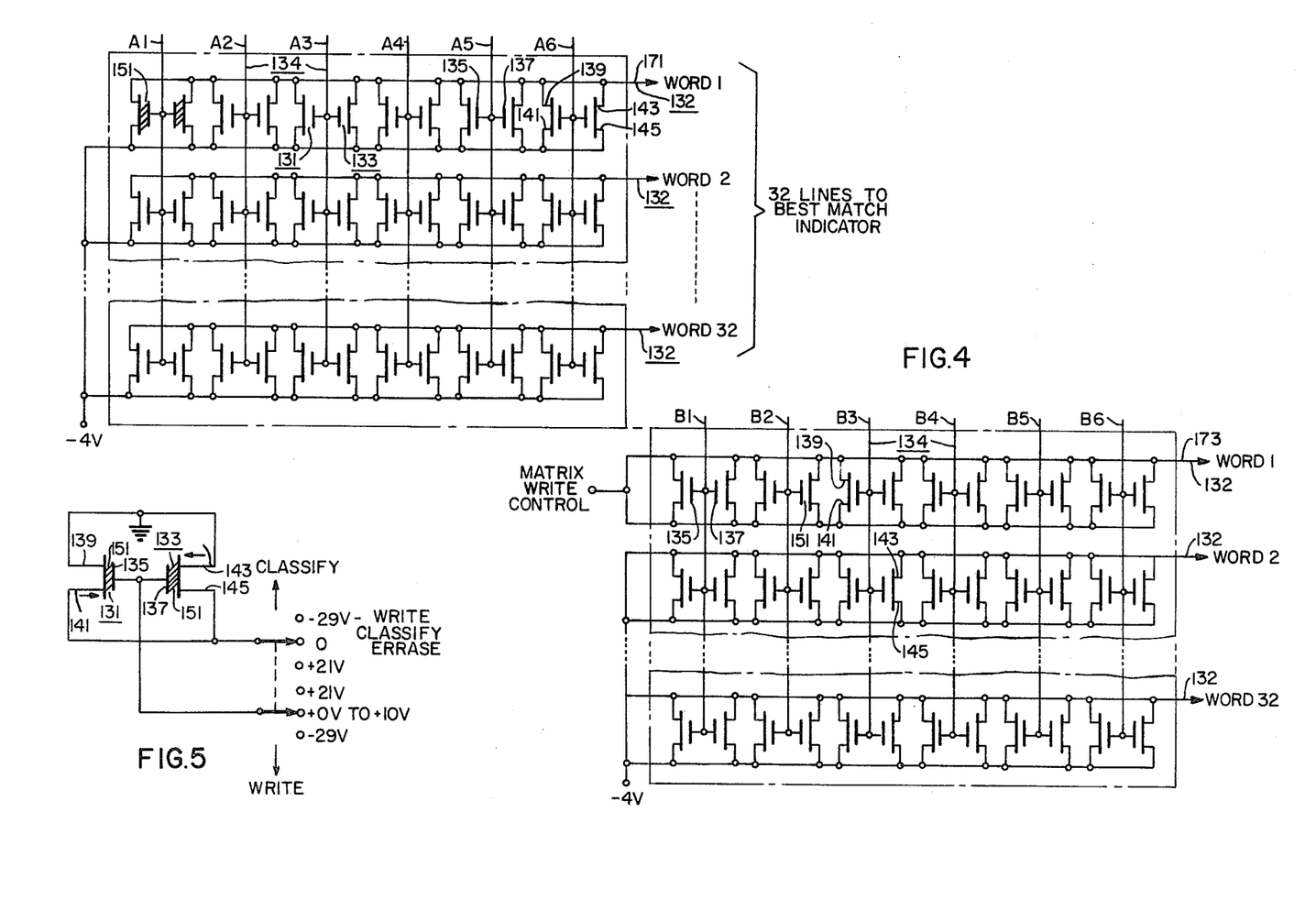
FIG. 4 is a schematic showing matrices A and B of FIG. 3, wherein the adaptive elements are pairs of complementary minstors.
FIG. 5 is a fragmental schematic showing the manner in which the minstors are connected in the practice of this invention, for writing (encoding), classifying, and to be erased.

As shown in FIG. 4, each Matrix A and B includes an array of pairs of complementary minstors 131 and 133 shown as in 32 rows 132 and 6 columns 134. The minstor pairs 131 and 133 are connected in parallel in each row 132 so that the total current for a row is the sum of the current through the pairs. The six columns correspond to the six channels which transmit data from the weight components 89 and 91. Minstor 131 is a N-channel minstor and minstor 133 is a P-channel minstor.

Each minstor 131 and 133 includes a gate 135 and 137, main electrodes 139 and 141 and 143 and 145 which are source or drain, depending on which electrode is connected to the substrate. Typically, for minstor 131, the source is electrode 141 and the drain electrode 139 and for minstor 133 the source is electrode 145 and the drain electrode 143 (FIG. 5). Each minstor 131 and 133 includes a dielectric 151 between the main electrodes 139, 141 and 143 and 145 and the respective gates 135 and 137. By applying a potential, typically of about 40 to 50 volts, between a gate 135 or 137 and the main electrodes 139, 141 or 143, 145 for a predetermined time interval, electric charges are injected into the dielectric and the flat-band voltage changes accordingly. This flat-band voltage operates as a threshold voltage for the flow of current between source and drain.

Figure 6:
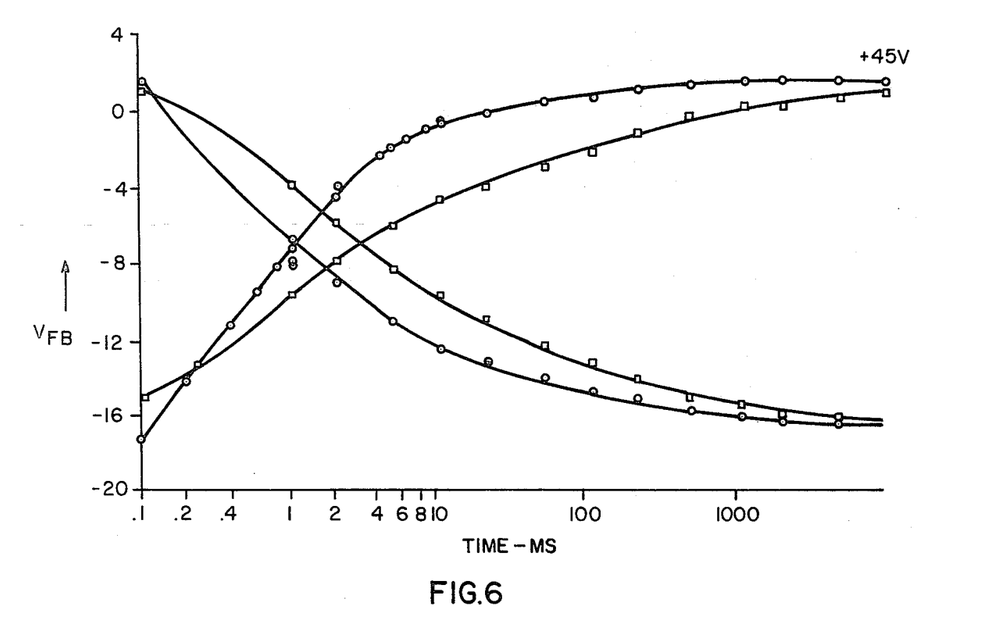
FIG. 6 is a graph showing, for a minstor, the relationship between the flat-band or threshold voltage and the time of charge or discharge of the dielectric between the gate and the source and drain.

This phenomenon is illustrated in FIG. 6 in which flat-band voltage is plotted vertically in volts and polarization time horizontally in microseconds on a logarithmic scale. Curves are plotted for the gates at 45V and 40V and −40V and −45V with respect to both main electrodes and substrate. Positive polarization voltages $V_{FB}$ set at selected magnitudes in one sense and negative polarization voltages, set at $V_{FB}$ is in the opposite sense. Thus, a polarization voltage of a given polarity will set $V_{FB}$ to a new setting and a voltage of the opposite polarity can rest $V_{FB}$ to the initial setting. Since the charges are bound within the dielectric 151, the minstor operates as an analog memory element in the setting of its flat band voltage. The memory can be set as an analog magnitude by applying the positive voltage for a predetermined interval, and erased, by applying the negative voltage, typically for about 1000 microseconds or more. The voltages and intervals shown in FIG. 6 are illustrative only and should in no respect limit the scope of this invention. Minstors may be designed for other voltages and for other intervals.

The sturation source-drain current, $I_{DSat}$, for a minstor is given by the equation:

$$I_{DSat} = \frac{\mu C_g}{2L}(V_g - V_{FB})^2$$

wherein
L = source-drain spacing
$C_g$ = gate capacity
$\mu$ = field effect mobility (a minstor is an insulated gate field-effect transistor (IGFET)
$V_g$ = gate voltage
$V_{FB}$ = flat-band voltage.

Figure 7:
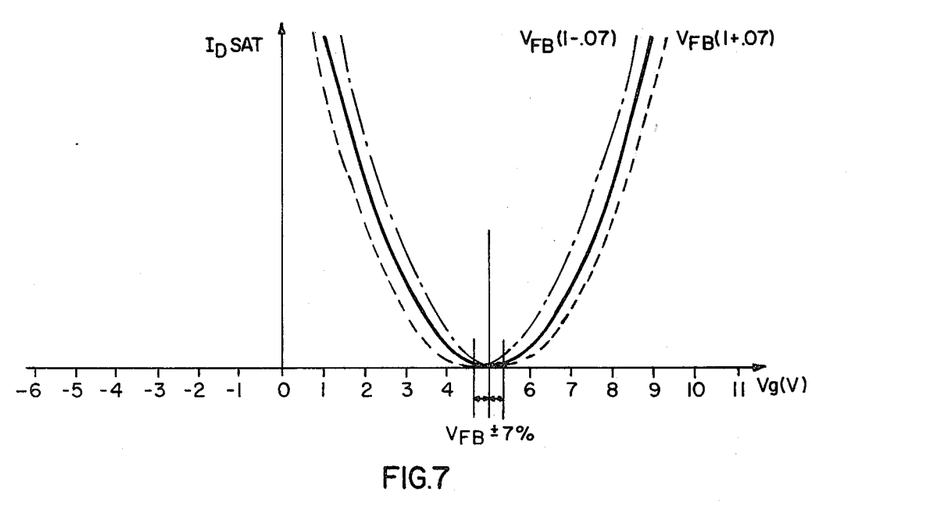
FIG. 7 is a graph showing the saturation-current vs. gate-voltage characteristic of a minstor at a selected flat-band or threshold voltage.

The saturation-current vs. gate-voltage characteristic for a minstor-pair 131–133 (matched) with a flat-band voltage of 5 volts is shown in FIG. 7. The full line curve 161 corresponds to an average pair. The broken line curve 163 and the dash-dot curve 165 give the range of variation of the characteristic for anticipated tolerances of ± 7% in the polariztion of the minstor pair. Such variation has no appreciable adverse effect in the practice of this invention.

The $I_{DSat} - V_g$ characteristic of a minstor pair for any $V_{FB}$ is seen to be a parabola whose axis or apex is at the flat-band voltage. $I_{DSat}$ is then a measure of the square of the deviation of the gate voltage from the flat-band voltage. The sum of $I_{DSat}$ for any row 132 is then a measure of the Eculidean distance between the gate voltage vector and the flat-band voltage vector.

In the practice of this invention the minstor pairs 131–133 are encoded by presetting the flat-band voltage $V_{FB}$. Typically, this may be accomplished as shown with respect to Matrix B in FIG. 4 by impressing a potential, for a time interval dependent on the desired encoding, of about 50 volts between the sources 141 and 143 and drains 139 and 145; each source and drain being connected and the gates 135 and 137 of each minstor pair. The encoding connected is shown with respect to the upper row of Matrix B. The source and drains of all pairs 131, 133 are connected together and the encoding is effected by impressing the 50 volt potential for the appropriate time intervals. The initial encoding, preceding the launching of the identification apparatus, is usually based on collected intelligence about friendly and hostile radars. After the apparatus is launched and senses hostile radar, the encoding is modified and set by the queuing register 101 as shown.

The adaptations corresponding to the sensed parameters are impressed as gate voltage $V_g$ on the respective encoded minstor pairs 131, 133. This is effected by impressing each sensed signal corresponding to a parameter on the gates 135, 137 of the pairs 131, 133 as shown with reference to Matrix A in FIG. 4. The comprison between the encoded and impressed adaptation is determined by the conduction of one or othe other of the minstors 131 or 133 of each pair. This is illustrated in FIG. 7. If the impressed parameter for a pair 131, 133 is equal to the encoded parameter, the impressed $V_g$ is equal to the encoded $V_{FB}$, and the current $I_{DSat}$ is zero. If one parameter deviates from the other, current flows between source 141 and drain 149 or between source 143 and drain 145, depending on the polarity of the deviation. The current magnitude is proportional to the square of the deviation. Since the minstor pairs of each row 132 are connected in parallel, the total current in a row is proportional to the square sum of all component deviations.

The output lines 171 and 173 represented typically as 32 in number, from the classifying matrix A or B, as the case may be, are connected by a two-position switch 172 consisting of two sets of 32 MOS transistors $Q_A$ and $Q_B$ (FIG. 8), controlled by write select signals Write A and its complement $\overline{\text{Write A}}$ derived from the computer 67. The command $\overline{\text{Write A}}$ means "do not write in Matrix A" or "write in Matrix B." In the classification mode, the row lines 171 of Matrix A (or the lines 173 of matrix B), with reference to FIG. 4, are connected to the gates of the transistors $Q_m$, by the +18 volt control level on the gates of the switches $Q_A$ (or $Q_B$). The drains 174 (or 175) of the transistors $Q_A$ (or $Q_B$), which carry the output currents of the classifying array, each have a load resistor $R_L$ returning to +30 volts (typically). Across $R_L$ is developed a voltage drop proportional to the row output current. The load resistor $R_L$ with least voltage drop corresponds to the matrix output line 171 or 173 with the least output current and hence to the row 132 for best match. This condition is detected with the aid of transistors $Q_m$, whose sources 177 are connected together and fed from a constant-current generator including transistor $Q_I$ and, typically, a 40 volt supply and whose drains 179 are connected to an array of e.g. 32 word threshold detectors 181. The gates of the transistors $Q_m$ are connected to the lower voltage negative ends of resistors $R_L$ so as to sense the voltage drops in them; only the transistor $Q_m$ with the highest positive gate potential (smallest voltage drop), corresponding to best match, conducts. The current in it may be called I, and is supplied by the constant current source $Q_I$.

Figure 8:
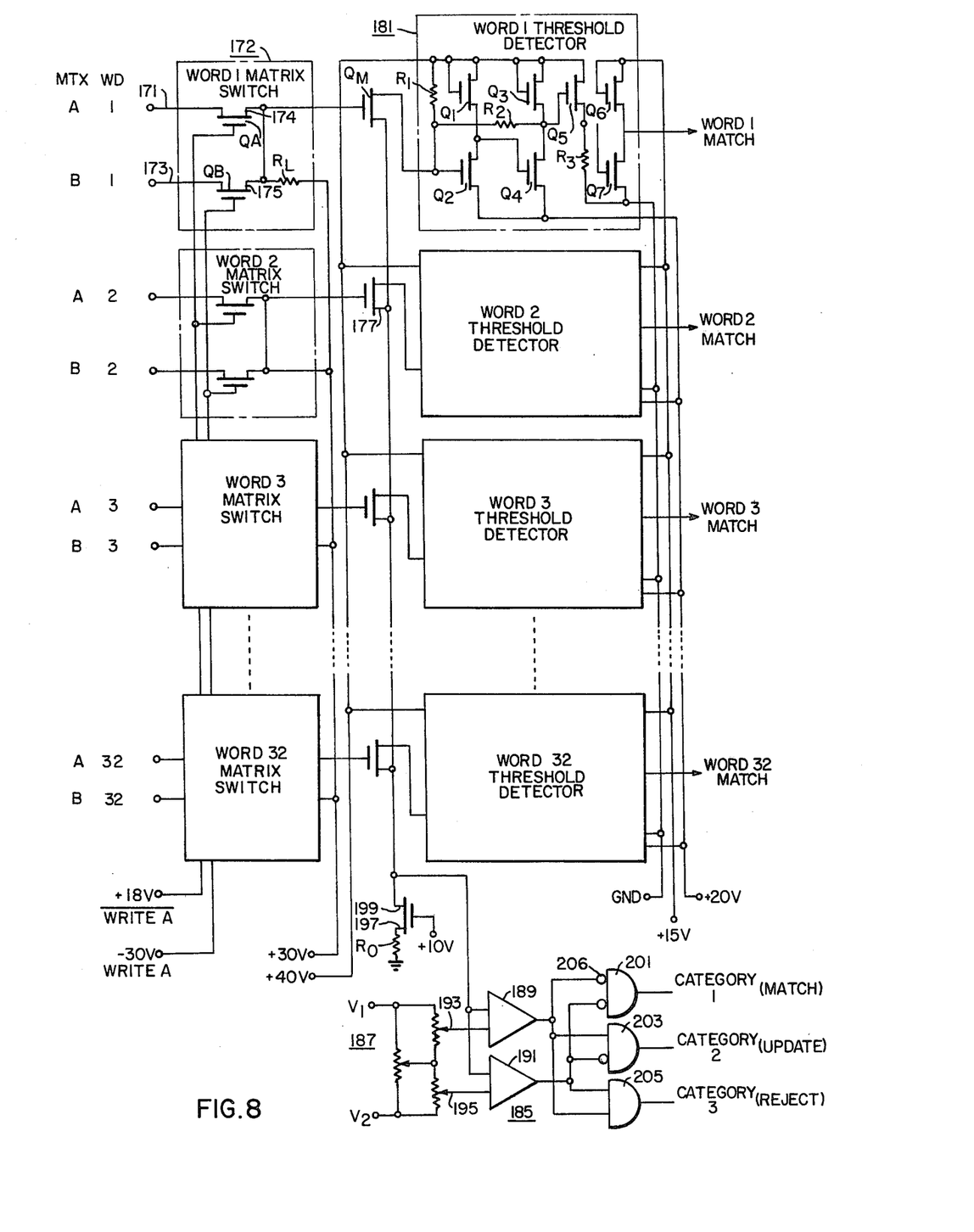
FIG. 8 is a schematic showing the best-match indicator of the apparatus shown in FIG. 3.

Each threshold detector 181 includes the transistors $Q_1, Q_2, Q_3$, and $Q_4$. The source-drain and gate voltages of the transistors are supplied from the constant-current source $Q_I$ and are distributed by resistors $R_1$ and $R_2$. The current conducted by the best-match transistor $Q_m$ trips the threshold detector 181 corresponding to the best-match line 171 or 172 in row 132. Typically, the detectors 181 are set, by selection of the resistors $R_1$ and $R_2$ to trip at about .6I. Each detector 181 includes transistors $Q_5, Q_6, Q_7, Q_8$ which cooperate with resistor $R_3$ to shift the level of the detector signal so that it is compatible with computer requirements.

Degree of match is evaluated by the NAND logic embodied in a comparison device 185, including a potentiometer 187 and comparators 189 and 191. The potentiometer 187 is set at its upper tap 193 to a voltage $Z_1$ and at its lower tap 195 to a voltage $Z_2$. $Z_1$ is smaller than $Z_2$. The comparators 189 and 191 compare the voltage $Z_1$ across the source 197 and drain 199 of the constant current transistor $Q_I$ and the resistor $R_O$ with the voltages $Z_1$ and $Z_2$ on taps 193 and 195. If Z is smaller than $Z_1$, the outputs of comparators 189 and 191 are both 0; if Z is greater than $Z_1$ but less than $Z_2$, the output of comparator 189 is 1, but that of 191 is 0; if Z is greater than $Z_2$, the output of both comparators 189 and 191 is 1. The comparison device includes the AND gates 201, 203, 205. AND gate 201 is set to produce an output of 1 only if both comparators 189 and 191 are in the OFF state, whereas 205 produces an output only if both 189 and 191 are ON. The AND gate 203 produces an output of 1 if 189 is ON and 191 is OFF, i.e. AND gate 201 produces a response for:

$Z < Z_1$ -Category 1
AND gate 203 for
$Z_1 < Z < Z_2$ -Category 2
AND gate 205 for
$Z_2 < Z$ -Category 3.

The rings 206 on the input of any logic gate indicates that the inversion of the input signal takes place. For category 1 the radar is identified as matched; for category 2 the radar is identified as matched, but the matrices A and B are updated; for category 3 there is no match and the corresponding data in the queuing register 101 is stored in empty locations in the matrices A and B.

If, as sometimes happens, multiple matches are present, the constant current I is insufficient to trip more than one word threshold detector 181, and either one or none are tripped. If none are tripped, this fact plus the presence of a Category 1 or Category 2 reports to the computer 67 that a multiple-match condition exists. The match location output of the Best Match Indicator is shown as 32 separate lines. However, 5-bit encoding of the match address can be added if required by computer interfacing.

Figure 9:
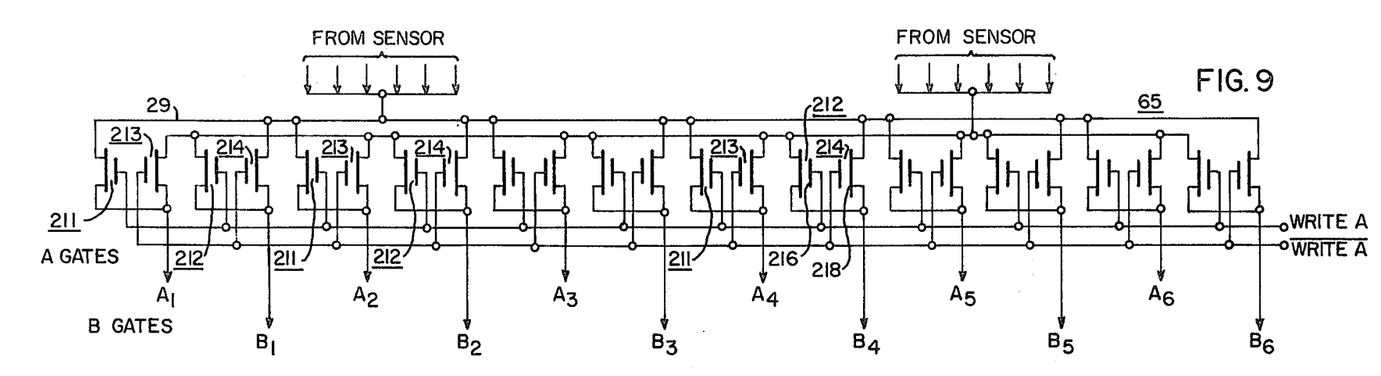
FIG. 9 is a schematic showing the matrix-input select switch of FIG. 3.

The matrix input select switch 65 (FIG. 9) includes a plurality (typically 6 for the six columns $A_1$ through $A_6$, or $B_1$ through $B_6$) of sets of MOS enhancement-mode transistors 211 and 213 and 212 and 214 which serve as switches to set the minstor pairs 131 and 133 (FIG. 4) of the Matrices A and B alternately to classify or to be encoded. As indicated in FIG. 9, the gates 215 and 216 of transistors 211 and 212 are set at −30 volts(typically) for $\overline{\text{Write A}}$, and for +30 volts for Write A, while the gates 217 and 218 of transistors 213 and 214 are set for +30 volts for Write A and −30 volts for $\overline{\text{Write A}}$. The word "Write" means encode and Write A means "do not encode A, encode B and read A in the classifying mode." Write A means "do encode A and read B in the classifying mode." In the $\overline{\text{Write A}}$, Write B setting the transistors 211 and 212 are non-conducting and the transistors 213 and 214 having +30 volts on their gates 217 and 218 are conducting. The outputs from weighting units 89 and 91 are then connected to columns $A_1$ through $A_6$ of Matrix A and the write or encoding inputs from the queuing register 101 are then connected to the columns $B_1$ through $B_6$ of Matrix B. In the Write A, $\overline{\text{Write B}}$ setting of the matrix input select switch 65, transistors 211 and 212 are conducting and the Write inputs from the queuing register 101 are connected to inputs $A_1$ through $A_6$ and the classify inputs from weight units 89 and 91 are connected to $B_1$ through $B_6$.

Figure 10A:
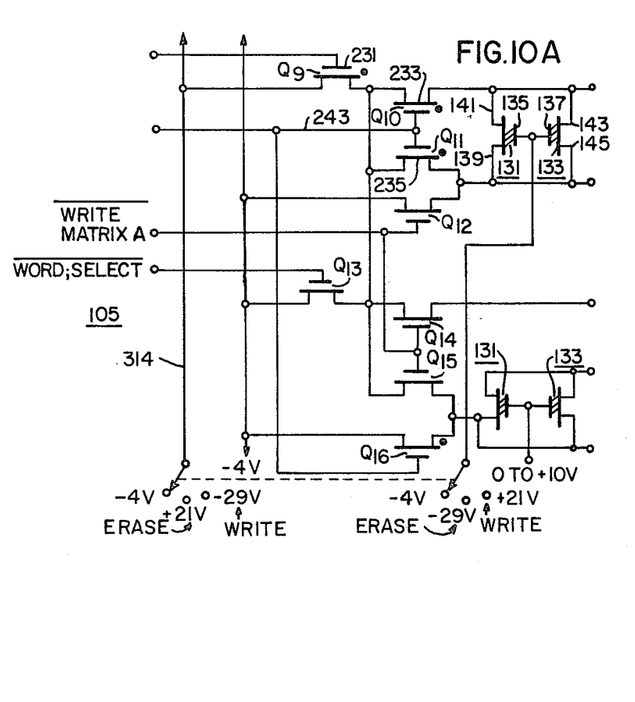
FIG. 10A is a schematic showing the matrix mode switching circuit of FIG. 3 as set to encode a selected line i of Matrix A.
Figure 10B:
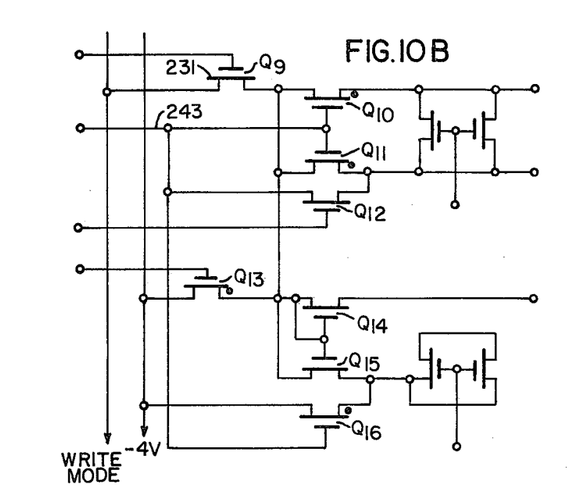
FIG. 10B is a like schematic as set for the other lines $k$ ($i \neq k$) of Matrix A.

FIG. 10A shows a unit of the mode switch 105 for a line or row $i$ of Matrix A which is to be encoded for updating and for the corresponding line of Matrix B which is to be read. FIG. 10B shows a unit of switch 105 for any of the other lines $k \neq i$ of Matrix A.

Each unit includes sets of transistors $Q_9$, $Q_{10}$, $Q_{11}$, and $Q_{12}$ for Matrix A and $Q_{13}$, $Q_{14}$, $Q_{15}$ and $Q_{16}$ for Matrix B. The select command to write in line $i$ of Matrix A is impressed on gate 231 of $Q_9$ rendering $Q_9$ conducting. Gates 233 and 235 receive commands to write, rendering $Q_{10}$ and $Q_{11}$ conducting, short-circuiting the drains and sources of the minstor pairs 131 and 133 of line $i$. Depending on whether the operation is to be an erase operation or a write operation, +21 volts (typically) is impressed on the source-drains of the minstor pairs through $Q_9$ and $Q_{10}$ and −29 volts on the gates 135 and 137, or −29 volts is impressed on the source-drains and +21 volts on the gates.

The write command for Matrix A is a read command for Matrix B impressing a potential on gate 237 of transistor $Q_{16}$ rendering $Q_{16}$ conducting. The −4 volts is then impressed on the sources 141 and the drains 145 of the minstor pairs 131 and 133 of Matrix B.

As to the rows other than $i$ of Matrix A, $Q_9$ is not rendered conducting because the appropriate potential is not impressed on gate 231 responsive to the row select command (FIG. 10B). The row-select command impresses a potential on gate 241 to render transistor $Q_{13}$ conducting. In addition $Q_{10}$ and $Q_{11}$ are rendered conducting by the potential on the write bus 243. The −4 volts is then impressed on the short-circuited sources and drains 141 and 143 and 139 and 145 of the minstor pairs 131 and 133 of the rows of Matrix A other than row $i$ (see FIG. 4). All rows of Matrix B are connected in the same way as described above.

The signature queuing register (SQR) 101, (FIG. 11) permits stacking of radar signature data awaiting writing into the matrices A and B. Because the write cycle time may be as long as a millisecond, and is much longer than the classify cycle time, it is posible that one or more radar signals requiring writing may arrive during a write cycle and such signals require temporary storage until such time as the writing control can process them. The SQR 101 has four analog memory locations - 251, 253, 255, 257, each consisting of 6 capacitors 259 which are used for this temporary radar signature data storage. Input access is provided by the 6 lines from the weight components 89 and 91 to 4 × 6 line multiplexer (MUX) consisting of commercial analog multiplexers 261, 263, 265 (typically Texas Instrument HI 1818), together with computer-provided input address channel 269 and input command channel 271 represented in FIG. 3 by channel 13. The lines 275, 277, 279. 281 from the multiplexers to the registers 251–257 each represents 6 inputs corresponding to the six-line inputs to the multiplexers 261, 263, 265. In each case two inputs are derived from each multiplexer. The values of capacitors 259 are selected to give approximately a $2 \times 10^{-7}$ sec. time constant (typically) while charging to new data values through switch and source impedances. This allows the stored potential to come within 0.1% of the asymptotic value for an access (enable) time of 1.5 microseconds.

Figure 11:
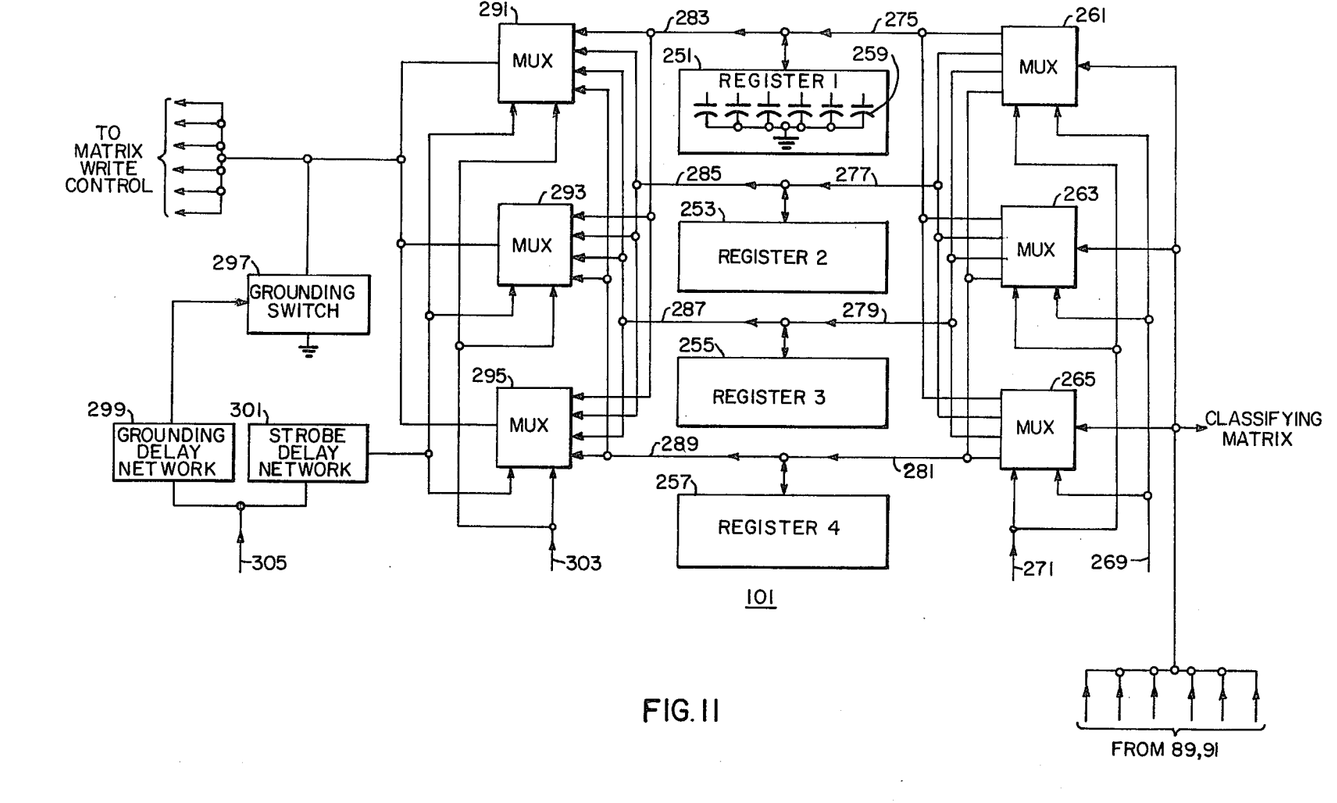
FIG. 11 is a block diagram showing the signature queuing register, SQR, of FIG. 3.

SQR 101 output access is provided in a similar manner through 6-line outputs 283, 285, 287, 289, and multiplexers 291, 293, 295, similar to multiplexers 261, 263, 265. However, when access is not required, as during an erase half-cycle, the six output leads to the encoding matrix A or B are grounded by grounding switch 297. To avoid discharge inadvertently the register capacitors 259 while making this ground connection, asymmetric delays are provided by grounding delay network 299 and strobe delay network 301 for the ground and enable commands respectively so as to provide, in effect, a break-before-make switching action. The commands to the queuing register 101 to identify the address of the register to be read and to enable the reading are impressed from the computer 67 through channels 303 and 305 which are part of channel 113 (FIG. 3).

Figure 12:
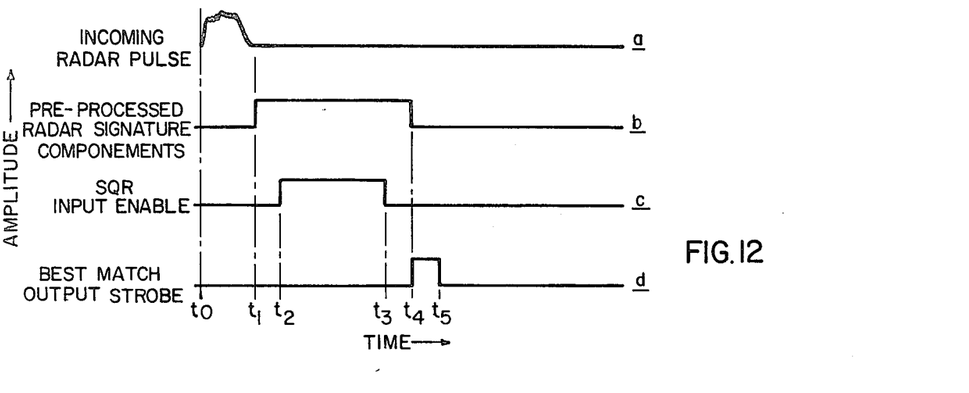

In graphs a through d of FIG. 12 the amplitude involved in the classify-timing sequence are plotted vertically and time horizontally. Points on the graphs which are along the same vertical line represent the same instant of time on all graphs.

The radar pulse is received in the interval between $t_o$ and $t_1$ and the radar signature components are produced at the outputs of the weight units 89 and 91 (FIG. 3) between $t_1$ and $t_4$. Between $t_2$ and $_3$ the computer 67 sends the enabling pulse to the queuing register 101. This interval occurs while the signature is being produced and commands the register 101 to store the signature. The best-match output strobe is sent to the best-match indicator 121 during the interval $t_4$–$t_5$.

The matrix write control 103 (FIG. 13) provides the various pulses required to perform a full write or encode cycle in the selected word (row) of the minstor write matrix A or B. The full write cycle consists of (1) an erase half-cycle, in which a negative voltage, say $-50$ volts (gate 29, source-drain +21) is impressed between the gates 135 and 137 and the source-drains 141–139, 143–145 of the addressed row for a relatively long time, perhaps $10^{-3}$ seconds, followed by (2) a write half-cycle, in which a positive voltage, say +50 volts (gate +21, source-drain $-29$), is impressed on the gates 135, 137 relative to the source-drains 141–139, 143–145 for varying periods proportional to the logarithms of the signal voltages being written into the matrix as threshold voltage (flat band voltage) settings.

FIGS. 14a through k are graphs showing the waveforms involved in the full write cycle. Amplitude is plotted vertically and time horizontally; points on the same vertical line through all graphs represent the same time for all graphs. The Write command pulse (a), SQR output address (b), matrix word address (c), and Write Matrix selection (d) are provided by the computer 67 through channels 111, 113, 301 and 109 (FIG. 3). The common source and drains 141, 139–143, 145 of the minstor pairs 131, 133 in the addressed row of the Write matrix A or B are held first at +21 volts during the Erase half-cycle, typically lasting $10^{-3}$ seconds (e), and then at $-29$ volts during the write half-cycle, lasting as much as $10^{-4}$ seconds. The pulses for the gate of the minstor pairs are opposite in polarity to the source and drain waveform and, during the erase half-cycle (h), are positive at +21 volts and, during the write time, are negative at $-29$ volts for each gate 135–137 for appropriate time intervals.

Figure 13:
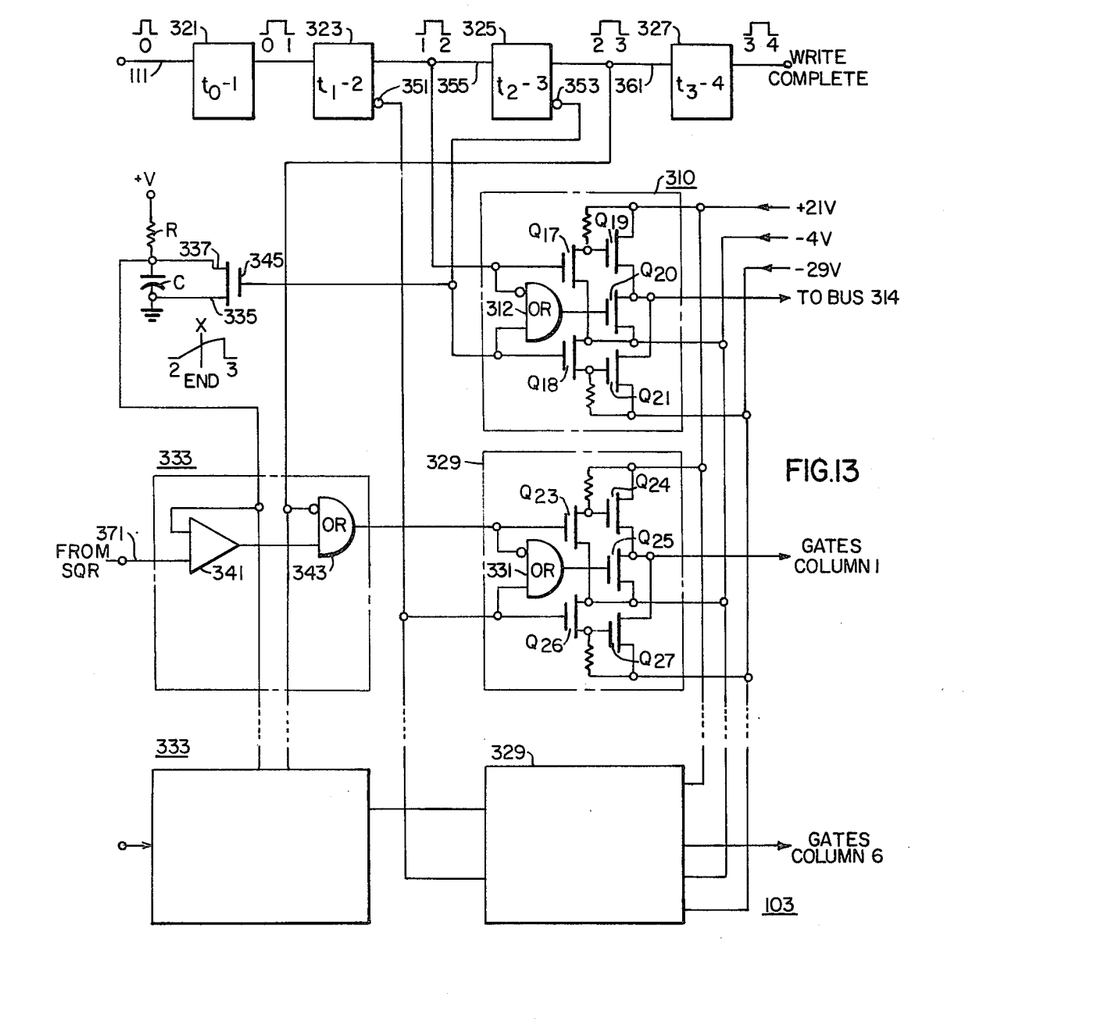
FIG. 13 is a schematic showing the matrix write (encode) control.
Figure 14:
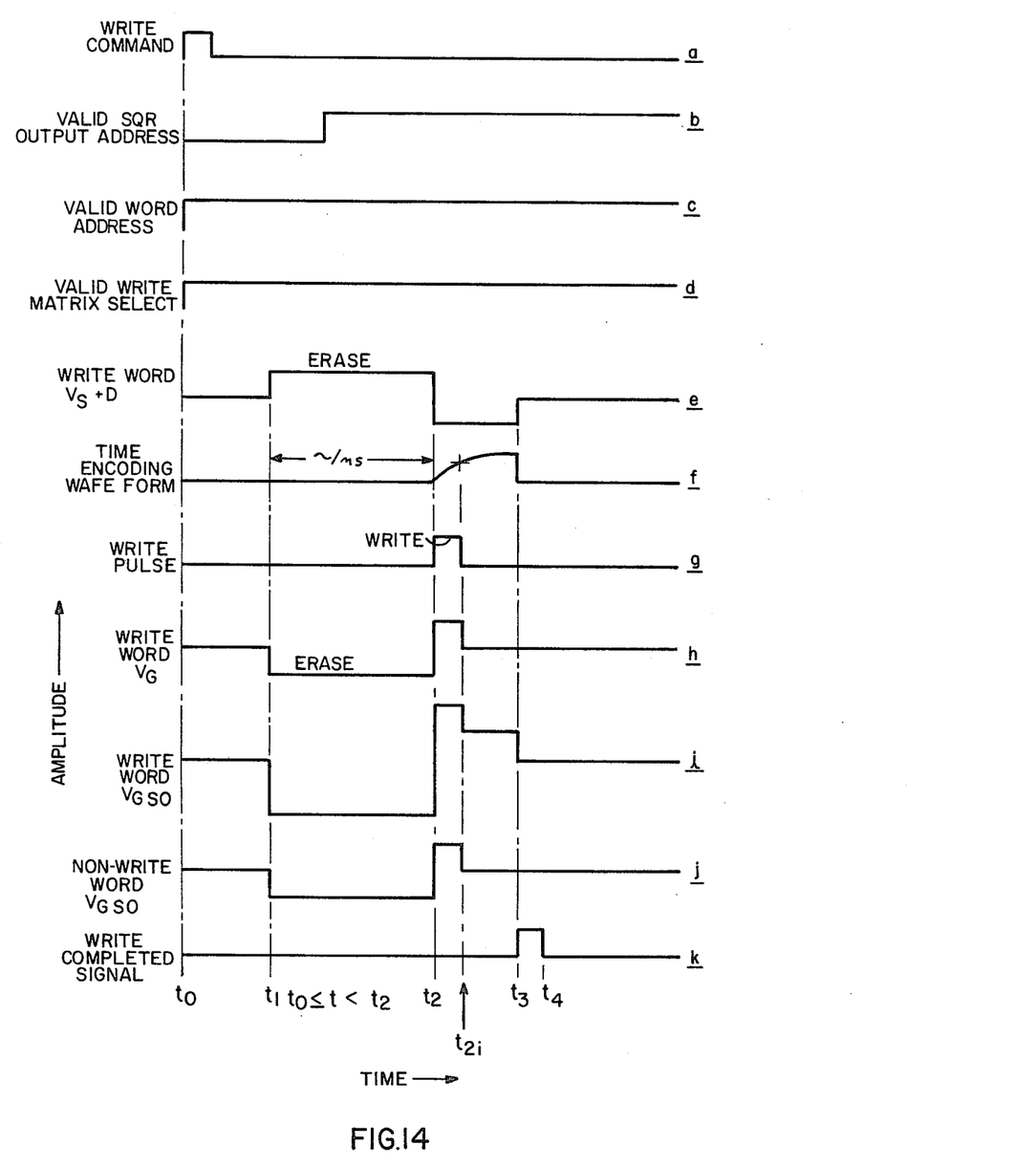

The time-encoding of the gate write waveform (f), i.e., conversion of the input data voltage level to time duration of the write pulse, is accomplished by comparing the input voltage with the instantaneous voltage of an exponential ramp (f) generated by the resistor-capacitor-switch combination R, C and $Q_R$ in FIG. 13. The write pulse (g) begins at the same time as this ramp (f) (FIG. 14) and ends when the input voltage is equal to the voltage across the capacitor C.

The matrix write control 103 includes transistors $Q_{17}$–$Q_{21}$ of a voltage control unit 310 (FIG. 13) whose transistors $Q_{17}$ through $Q_{21}$ connect the gate line of the minstor pairs to $-4$, $-29$, and +21 volts in the proper manner to create the write waveform for each gate line. This control unit 310 also contains an exclusive OR gate 312 which controls transistors $Q_{17}$–$Q_{21}$.

The write-control matrix 103 includes in addition to the control unit 310, a plurality of timing or delay components 321, 323, 325, 327 which produces the indicated pulses during intervals $t_o$–$t_1$, to $t_3$–$t_4$ as shown in FIG. 14. The incoming write command signal is derived from the computer 67. Control units 329 control the impressing of encoding signals on the gates 135–137 of the minstor pairs 131–133 of each column 1 through 6 of matrix A or matrix B (FIG. 4). Each unit 329 includes transistors $Q_{22}$, $Q_{23}$, $Q_{24}$, $Q_{25}$ and the exclusive OR gate 331. Each unit 329 is controlled by an encoding unit 333 including a capacitor C which is charged through a resistor R. The charging of capacitor C is controlled by transistor $Q_R$ whose source 335 and drain 337 are connected across the capacitor C. While charging the capacitor C produces at its output 339 the ramp function (FIG. 14f). The unit 333 also includes a comparator 341 and the exclusive OR gate 343. A signature component or voltage, which during updating is derived from the queuing register 101 (FIGS. 3 and 11), is impressed on line 371 of comparator 341. This voltage is compared with the voltage on capacitor C. Separate unit 333 including a capacitor C and resistor R is associated with each unit 329 and with each column 1 through 6 so that the columns may be encoded simultaneously. The transistorS in FIG. 13 whose polarity is not labelled are rendered conducting with a 0 signal in their gates and become non-conducting for a 1 signal. The transistors labelled N are conducting for 1 signal on their gates and are non-conducting for a 0 signal on their gates. In the absence of a write command, the lines between the components 321–327 have a zero signal but the connections 351 and 353 to the sides of components 323 and 325 (hollow circles) are inverted and carry 1 signals.

With no signal on the output of component 325, the inverted output from terminal 353 of component 325 impressed on gate 345 of transistor $Q_R$ is 1 and $Q_R$ conducts short-circuiting capacitor C. When $Q_R$ is rendered non-conducting Capacitor C is charged through resistor R and the ramp function (FIG. 14f) is produced and is compared by comparator 341 with the input signature component. Comparator 341 produces a 0 when the voltage on line 371 is greater than the voltage on C and a 1 when these voltages are equal.

It is assumed that the write command is impressed and that the time interval is between $t_0$ and $t_1$ (FIG. 14). C is short-circuited by $Q_R$. There is an OR 312 a 0 from line 355 and a 1 from terminal 353. $Q_{20}$ conducts connecting $-4$ volts to bus 314 (FIGS. 10A, 10B) and through this circuit on the sources and drains of the minstor pairs 131, 133 of matrix A to be encoded (FIG. 14e left). At this time there is a 0 from line 361 on OR gate 343 and a 0 from the comparator (since charge on 0 is 0). OR gate 331 has a 0 from 343 and a 1 from 351 and $Q_{25}$ in units 329 conducts impressing $-4$ volts on all gates (FIG. 14h, left).

Between $t_1$ and $t_2$ (erase interval, FIG. 14h) terminal 351 impresses a 0, line 355 a 1, (OR 331 output is 1), terminal 353 a 1 and line 361 a 0 (OR 312 output 0). $Q_{20}$ stops conducting; $Q_{17}$ and $Q_{19}$ conduct and +21 volts is impressed on bus 314 (FIGS. 10A and 10B) and between the sources and drains of the minstors 131, 133 Matrix A (FIG. 14e, between $t_1$ and $t_2$). The inputs of OR 331 have a 0 from terminal 325 and a 0 from OR 343. $Q_{25}$ stops conducting; $Q_{26}$ and $Q_{27}$ conduct and $-29$ volts is impressed on the gates 135 and 137 of the minstor pairs of Matrix A. (FIG. 14h between $t_1$ and $t_2$). During this interval there is $-29V + 21V$ or $-50V$ between the gates 135, 137 and the sources and drains 141–139 and 143–145 of the minstor pairs 131, 133 in the selected row $i$. The gate-source-drain voltage for the other rows is $-25$; $-4$ in the gates 135, 137 and $+21$ on the source-drains.

During the interval $t_2$–$t_3$ output 353 is 0 and line 361 is 1. $Q_R$ becomes non-conducting and the capacitor C charges to produce the ramp function (FIG. 14f). OR 343 has a 1 input from line 353 and OR 312 0 inputs from 355 and 353. $Q_{23}$ and $Q_{24}$ conduct and $+21$ volts is impressed on the gates 135, 137 of the minstor pairs of the selected row. $Q_{18}$ and $Q_{21}$ conduct and $-29V$ is impressed through $Q_{21}$ from bus 314 on the source-drains of minstor pairs 131, 133 of the selected row. This potential is impressed so long as the voltage on the signature line 371 exceeds the voltage on C. At time $2_t$ (FIG. 14) the voltage on C and the voltage on 271 become equal. When the difference between these voltages is zero, the output of the comparator 341 becomes 1 and $Q_{23}$ and $Q_{24}$ stop conducting. The output of OR 331 becomes 1 and $Q_{25}$ conducts impressing $-4$ volts on the gates 135–137 (FIG. 14h). The flat-band voltages of each minstor 131, 133 in the selected row is thus set (FIGS. 14g, 14h). FIG. 14i shows that during writing, between $T_2$ and $T_{2t}$, the gate-to-source-drain voltages of the minstors is 50 and between $t_{2i}$ and $t_3$ this voltage drops to 25. The gate to source-drain voltage of the minstors in the other rows is 25 and drops to 0 (FIG. 14j). These voltages are not set by the write control circuit.

At the end of the interval $T_{2-3}$ output 353 becomes 1 and $Q_R$ conducts short-circuiting capacitor C (FIG. 14f at $t_3$). $Q_{17}$, $Q_{18}$, $Q_{19}$, $Q_{21}$ become or remain non-conducting, but $Q_{20}$ becomes conducting (1 on 312). The source-drains of all minstors are set at $-4$ volts (FIG. 14e). OR 343 has 0 at both inputs; OR 331 has a 0 at one input from 343 and 1 at the other from 351. $Q_{25}$ conducts and $-4$ volts is impressed on the gates 135–137. (FIG. 14h - right-hand end). The net voltage between source-drains and the gates of minstors 131, 133 which have been encoded is 0 (FIG. 14i). The pulse between $t_3$ and $t_4$ (FIG. 14k) signals the computer 67 that the write or encode cycle is complete.

While preferred embodiments of this invention have been disclosed herein, many modifications thereof are feasible. This invention is not to be restricted except insofar as is necessitated by the spirit of the prior art.

We claim:

1. Apparatus for identifying one or more of a plurality of radar systems operating in a given region from selected parameters of each of said radar systems, the said apparatus including sensing means for deriving said parameters, said parameters for the different systems being derived at short intervals, typically less than a microsecond, the said apparatus also including at least one matrix having columns and rows of adaptive means, said adaptive means being capable of being set by adaptation in a setting responsive to predetermined adaptation, each of said adaptive means in each row being assigned to one of said selected parameters, adaptation means connected to said rows, for encoding the adaptive means in said rows with different sets of adaptations corresponding to parameters of said systems, each adaptive means in each row being encoded corresponding to its assigned parameter, means for impressing on each of said columns, in comparing relationship with the encoded parameter of the adaptive means of each of said respective columns, an adaptation corresponding to a parameter derived by said sensing means, which parameter corresponds to the assigned parameter of the adaptive means in each of said respective columns, said parameters being impressed substantially simultaneously in each of said columns and said adaptive means substantially in real time producing a response dependent on the deviation of the adaptation impressed thereon from the predetermined adaptation encoded thereon, and means connected to said rows for indicating the row in which the measure of the deviation of the impressed adaptation from the encoded adaptation is a minimum.

2. The method of identifying one or more of a plurality of radar systems operating in a given region from selected parameters of each of said radar systems, the said parameters being manifested at short intervals typically less than one microsecond, the said method being practiced with apparatus including at least one matrix having columns and rows of adaptive means; the said method comprising:
   a. assigning to the adaptive means of each said column a different one of said parameters,
   b. encoding each adaptive means of each row with an adaptation, each adaptation on adaptive means corresponding to the parameter assigned to the column of said last-named adaptive means, the sets of adaptations encoded on the adaptive means in different rows being different, but, for each row, corresponding to a set of parameters of one of said radar systems,
   c. sensing the said parameters from said radar systems,
   d. deriving from each of the said sensed parameters an adaptation,
   e. impressing the said adaptation derived from each sensed parameter on the adaptive means of the column assigned to said respective parameter, said adaptation being impressed substantially simultaneously on the adaptive means of all said columns,
   f. comparing, for each adaptive means, the encoded adaptation with the impressed adaptation to derive a measure of the deviation of the impressed adaptation from the encoded adaptation, the said encoded and impressed adaptation for all adaptive means being compared and the deviation for each adaptive means being derived substantially on real time and
   g. determining the row of said matrix for which the measure of the total deviation is a minimum.

3. The method of claim 2 wherein one of the selected parameters is the angular location of each radar system with respect to the apparatus and the adaptation for the angular location of a radar system is derived by sensing the difference of the logarithms of a pair of rectangular angular-location components of said angular location and converting said difference into a ratio of one said component to the other.

4. The method of claim 2 wherein the measure of the total deviation is compared with a smaller magnitude $Z_1$ and a larger magnitude $Z_2$ and the following procedure is followed:
  a. if the measure is smaller than $Z_1$, the radar system for which the measure is produced, is treated as identified;
  b. if the measure is larger than $Z_1$ and smaller than $Z_2$, the encoding, for the radar system, for which the measure is produced, in the row of the matrix for which the said minimum measure is produced, is updated with newly secured intelligence and the identifying process as set forth in claim 2 is repeated;
  c. if the measure is larger than $Z_2$, the radar system for which the measure is produced is treated as unidentified.

5. The apparatus of claim 1 including at least two matrices and also including switch means for connecting at least one selected row of one of said matrices to be encoded with updated adaptation while connecting the adaptive means of the other matrix in comparing relationship with parameters impressed on the columns of said last-named matrix.

6. The method of claim 2, practiced with at least a first and a second matrix and storing means for storing sensed parameters from radar systems, the said method comprising:
  a. assigning to the adaptive means of corresponding columns of each matrix a different one of the parameters of a radar system to be identified;
  b. encoding the adaptive means of the corresponding rows of each matrix with adaptations, each adaptation on an adaptive means corresponding to the parameter assigned to the column of said respective adaptive means, the sets of adaptations impressed on adaptive means in different rows being different, but, for each row, corresponding to a set of parameters of one of said radar systems;
  c. impressing an adaptation derived from each sensed parameter on the column of said first matrix to whose adaptive means the said respective parameter is assigned;
  d. storing in the storing means a magnitude of each said sensed parameter impressed on the columns of said first matrix;
  e. comparing the encoded adaptation of each adaptive means of said first matrix with the impressed adaptation of said respective adaptive means to derive a measure of the deviation of the impressed adaptation from the encoded adaptation;
  f. determining the row of said first matrix for which the measure of the total deviation is a minimum;
  g. evaluating said last-named minimum with reference to a smaller mangitude $Z_1$ and a larger magnitude $Z_2$;
  h. if the said minimum is greater than $Z_1$, but less than $Z_2$, treating the radar system from which the said adaptations of sub-paragraph (c) of this claim were derived as identified; and
  i. updating the row of said second matrix, which row corresponds to said row determined pursuant to sub-paragraph (f) of this claim, by transferring to said row of said other matrix the said magnitudes stored in the storing means.

7. The apparatus of claim 1 including switch means, connected to the matrix, and operating alternately, for connecting the adaptive means in at least one selected row of the matrix to be encoded with updated adaptations and for impressing on each column of the matrix, in comparing relationship with each respective parameter of said adaptive means of said respective column, an adaptation corresponding to a parameter derived from the sensing means, which parameter corresponds to the assigned parameter for the adaptive means of each respective column.

8. The apparatus of claim 1 wherein the adaptive means are components which produce a response substantially equal to the square of the difference between the magnitudes of the encoded and impressed adaptations and the measure of the deviation for any row of the matrix is the sum of the square of said deviations.

9. The apparatus of claim 1, wherein some of the parameters of the radar systems lend themselves to digital evaluations while others lend themselves to analog evaluation and certain of the columns of the matrix include digitally operating adaptive means while other of said columns include analog operating adaptive means.

10. The method of claim 2 wherein the apparatus for practicing the method includes computer means and wherein the radar system has, in addition to the parameters processed by the matrix, other parameters, said other parameters being processed directly by the computer.

11. The method of claim 10 wherein the other parameters include the pulse repetition frequency, and the pulse repetition frequency is determined by the computer by processing the data which the computer derives from the matrix during an earlier classification, and a later classification.

* * * * *